United States Patent [19]

Kopper

[11] Patent Number: 5,535,381
[45] Date of Patent: Jul. 9, 1996

[54] APPARATUS AND METHOD FOR COPYING AND RESTORING DISK FILES

[75] Inventor: David J. Kopper, Shrewsbury, Mass.

[73] Assignee: Data General Corporation, Westboro, Mass.

[21] Appl. No.: 95,878

[22] Filed: Jul. 22, 1993

[51] Int. Cl.⁶ .............................. G06F 11/22; G06F 15/00
[52] U.S. Cl. .................... 395/600; 395/182.04; 395/488; 395/489
[58] Field of Search ................................... 395/400, 425, 395/575, 600, 404, 445, 182.04, 488, 489

[56] References Cited

U.S. PATENT DOCUMENTS

| | | | |
|---|---|---|---|
| 5,086,502 | 2/1992 | Malcolm | 395/575 |
| 5,109,505 | 4/1992 | Kihara | 395/575 |
| 5,210,829 | 5/1993 | Bitner | 395/250 |
| 5,226,157 | 7/1993 | Nakano et al. | 395/600 |
| 5,404,508 | 4/1995 | Konrad et al. | 395/600 |

FOREIGN PATENT DOCUMENTS 2-81224  3/1990  Japan.

*Primary Examiner*—Tod R. Swann
*Assistant Examiner*—Tuan V. Thai
*Attorney, Agent, or Firm*—Robert L. Dulaney

[57] ABSTRACT

A method and apparatus for backing up files from a logical disk are described to a backup tape and restoring all or part of the files to the logical disk. Separate "backup" and "copy" buffers in the host processor's main memory are employed during a backup operation. Backup buffers hold data read from the logical disk during the sequential backup operation. Copy buffers hold data read from the logical disk prior to execution of a write operation to a portion of the disk not yet backed up. Data is stored on the backup tape in logical tape records containing either backup data or copied data. A full restoration of all files can be done in one read of the backup tape. A partial restoration of selected files can be done in two reads of the backup tape.

9 Claims, 7 Drawing Sheets

APPARATUS AND METHOD FOR COPYING AND RESTORING DISK FILES

BACKGROUND OF THE INVENTION

1. Field of the Invention

The present invention relates generally to data storage systems for use with computers and more particularly to an apparatus and method for transferring the information from one or more disks to a backup tape and restoring the information from the tape back to the disk.

2. Description of the Prior Art

Data processing systems commonly use one or more hard disks for storage of data or programs that are not currently required to be in the internal random access memory of the host computer. The host will retrieve from the disk system the particular information currently required and will send to the disk system for storage new or updated information or data or programs which the host does not require at that time. Modern disk systems are capable of rapidly storing and retrieving large quantities of data and are, in general, highly reliable devices. However, occasionally failures or faults do occur in disk systems and, in the event of such a failure, all or part of the data stored on the system may be lost or rendered unreliable.

It is, therefore, highly desirable from time to time to make a copy of the information stored on the disk system so that the user of the system is able to reconstruct the data into a known condition in the event of a system failure or other problem causing a loss of data integrity. A common practice with larger computer systems is to periodically perform a backup of the data on the disk system. Typically this is done by copying the data, or selected portions of it, onto one or more magnetic tapes. The tapes are then retained for a period of time, as determined by the system user, and are available for use in restoring the system to a known condition, if necessary. In some cases it may be necessary to restore the entire disk file system while in other cases, such as inadvertent deletion of a few files by an individual user, it may be necessary to restore only those particular files.

The backup needs to be a "snapshot" of the disk systems at a particular instant in time. Since modern data processing systems often have disk systems with extremely large storage capacity, the backup operation can sometimes take several hours to transfer the disk data to tape. Once the backup operation has started, some procedure must be used to ensure that the data on the disk is not modified until it has been stored on tape. If the users of the system are allowed unrestricted access to the data files on the disk, the exact condition of the data on the disk would not be consistent. The typical means of ensuring data consistency is to restrict users from having access to the data during the backup operation. Many times these backups are performed during late night hours when users are usually not inconvenienced by being locked out of the system. However, as data processing systems become larger and as networked users around the world become able to access the same system 24 hours a day, it becomes much less acceptable to prohibit access to the system for prolonged periods of time.

The present invention resolves this problem by allowing users unrestricted access to the system while the backup operation is underway.

SUMMARY OF THE INVENTION

The present invention relates to a method and apparatus for storing the information from a logical disk onto a backup tape and restoring all or part from the backup tape to the logical disk.

It is an object of the invention to create a backup tape containing a "snapshop" of the information on the logical disk.

It is another object of the invention to allow rapid, consistent backup of the logical disk information while users continue to have access to the logical disk.

It is a feature of the invention that separate buffers for handling backup data and copy data are employed in the backup process.

It is another feature of the invention that sections of disk blocks are sequentially read from the logical disk and placed in backup buffers.

It is a further feature of the invention that, if a write request is received to a location on the logical disk that has not been backed up, a copy of the data at that location is saved to a copy buffer prior to execution of the write request.

It is an additional feature of the invention that information from the backup and copy buffers is stored on the backup tape in logical tape records, each tape record containing either backup data or copied data.

Other features and advantages of the present invention will be understood by those of ordinary skill in the art after referring to the detailed description of the preferred embodiment and drawings herein.

DESCRIPTION OF THE PREFERRED EMBODIMENT

Figure 1:
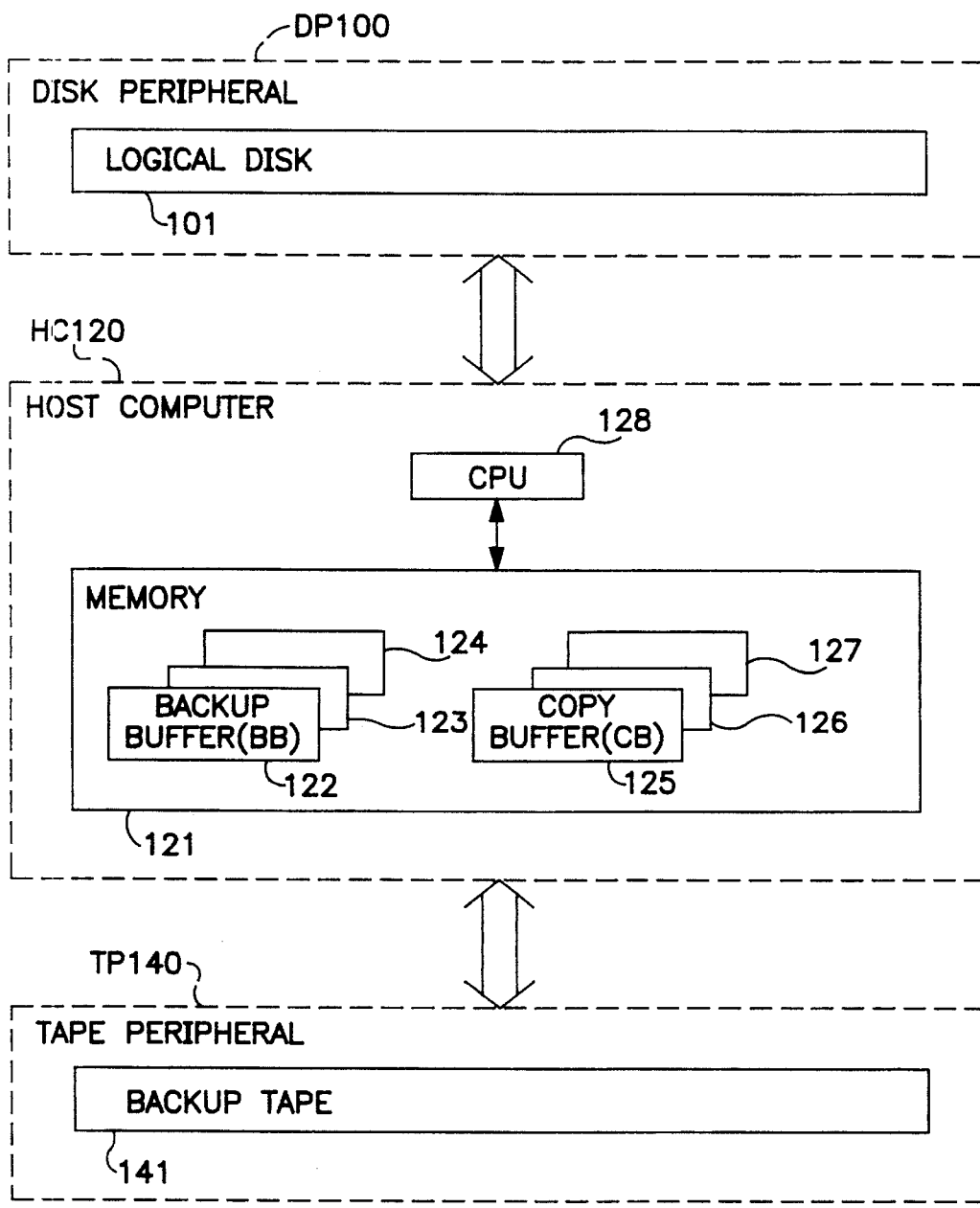
FIG. 1 is a block diagram of a data processing system.

Referring to FIG. 1, DP 100 represents a disk peripheral connected to host computer system HC 120. DP 100 may comprise a single disk, multiple disks or a disk array. TP 140 represents a tape peripheral connected to HC 120. TP 140 may comprise one or more physical tape drives.

As is well understood in the art, computer operating systems have various functional components to handle and facilitate communication between the computer and its disk storage device. These components typically include a file manager facility for dealing with the data file system at the file name and directory level; a logical disk manager facility for mapping the file system into corresponding unique logical addresses on a "logical" disk; and a system area manager facility for converting the logical disk addresses into physical addresses on the one or more physical disks which actually make up the disk system.

The disk backup technique discussed herein is a logical disk backup, i.e., the information stored on the logical disk will be sequentially accessed by logical address, from the lowest to the highest, until all information has been moved to the backup tape. LD 101 represents a logical disk having a logical address range of O to N, where N is determined by the storage capacity of the physical disk or disks available to the system in DP 100. Memory 121 is the internal random access memory of HC 120. BB 122–124 and CB 125–127 are buffers in memory 121 used in connection with the backup operation. As will be discussed in more detail below, it will typically be desirable to have a number of these buffers. CPU 128 is the central processing unit of HC 120. BT 141 is the magnetic tape in TP 140 that will receive the backup information from HC 120.

Figure 2:
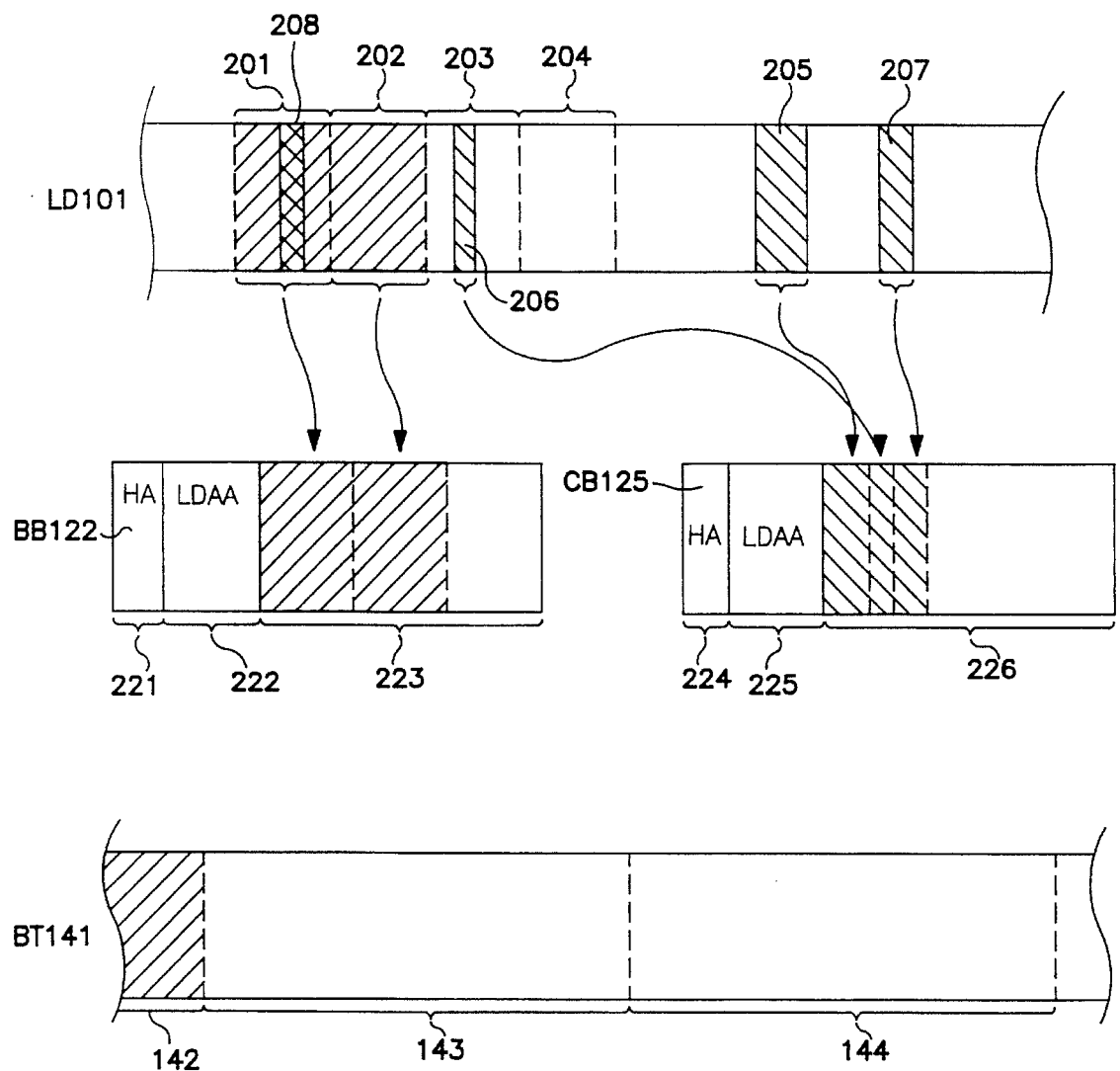
FIG. 2 depicts the operation of a data processing system incorporating the invention.

FIG. 2 shows the interrelationship among the system elements in more detail. An illustrative section of LD 101 is depicted. Sections 201, 202 and 203 represent areas of information on LD101. In a preferred embodiment, these areas were selected to be 64K bytes to facilitate rapid and efficient movement of data from LD 101 through HC 120 to TP 140. Other size areas could readily be employed.

Backup buffers BB 122–124, in a preferred embodiment, are each 224K bytes. By way of illustration, only BB 122 will be shown and described in FIG. 2. The other backup buffers have a similar function and internal structure. BB 122 comprises a header area HA 221, a logical disk address area LDAA 222 and a data area 223. When a backup buffer, such as BB 122, is filled, the contents of the buffer are sent to BT 141 as as a 224K byte logical "tape record". A logical tape record may be made up of multiple physical tape records.

HA 221 contains information descriptive of the contents of BB 122, including a unique identifier for the tape record and the number of logical disk addresses in LDAA 222. LDAA 222 contains the logical disk address of each of the disk blocks contained in data section 223. In a preferred embodiment, a disk block, representing the standard unit of data handled by the disk drive controller, is 512 bytes and data section 223 is 192K bytes. Section 223 is therefore capable of holding three 64K data sections from LD 101.

Copy buffers CB125–127 are each, in a preferred embodiment, 224K bytes. By way of illustration, CB 125 will be described. The other copy buffers have a similar function and internal structure. CB 125 comprises a header area HA 224, a logical data address area LDAA 225 and a data area 226. HA 224 contains a unique tape record identifier and the number of logical disk addresses in LDAA section 225. LDAA 225 contains the table of logical addresses for each disk block of copied data in section 226. As discussed in more detail below, data section 226 contains a number of sections of LD 101 data of varying sizes copied into the buffer. When CB 225 is filled, the contents are moved to BT 141 as a logical tape record. As will be understood by one in the art, the number of backup and copy buffers in use during the backup could be changed and they could be made larger or smaller as appropriate for the size and characteristics of the disk system, the processor, the operating system and the tape system.

The method and apparatus described herein is of particular usefulness with data processing systems employing an operating system that is capable of having multiple threads of execution and supporting shared memory access. Operating systems of this type would include, for example, the AOS/VS II operating system from Data General Corporation and the UNIX operating from UNIX System Laboratories. Multiple processing threads could be employed in the process of moving sections from LD 101 to a backup buffer and, therefore, increase the speed of the backup process.

For ease and clarity of presentation, FIGS. 2 through 7 will be discussed from the standpoint of a single processing thread. It will be readily understood that, as discussed in the preceding paragraph, multiple processing tasks could be assigned to perform the file system backup and the number of backup and copy buffers could be expanded. In a preferred embodiment using an ECLIPSE MV computer from Data General Corporation running the AOS/VS II operating system, six processing tasks are assigned to perform the backup and ten backup buffers and five copy buffers are employed. The aforementioned six processing tasks are dedicated to the processing of data for the backup buffers. As will be discussed below, it is not necessary to assign specific processing tasks to the operations related to copy buffers CB 125–127. The use of multiple tasks and multiple buffers allows a steady and high speed flow of data from the computer systems to the tape device. This will keep the backup tape device constantly running, thereby avoiding backhitch and other potential problems that may arise if the tape device is faster than the data stream from the processor and, therefore, is frequently being stopped and started.

FIG. 2 shows the system while a backup is in progress. It should be understood, that, except for a brief period of system stabilization and database checkpointing in preparation for starting the backup, the system shown and described herein allows the computer system to be up and running and allows users to access their data files in LD 101 while the backup is in progress. Conceptually, LD 101 is being read from left to right, from lower logical addresses to higher addresses. At the instance depicted in FIG. 2, the data from section 201 has been read from LD 101 and stored in section 223 of BB 122. Similarly, the data from section 202 has been stored in section 223 of BB 122. HA 221 and LDAA 222 are updated each time a section is moved from LD 101 to BB 122, therefore, at the instant depicted, HA 221 contains the number of disk blocks currently in 223 and LDAA 222 contains the logical addresses of those disk blocks.

The next section of LD 101 to be moved to BB 122 will be section 203, which will be placed in the available space remaining in section 223. When the transfer of data from 203 to 223 is completed and HA 221 and LDAA 222 are updated, the tape record in BB 122 will be complete and will be ready to be transferred to BT 141. While the process of transferring the contents of BB 122 to BT 141 is underway, the next area of LD 101, section 204, will be placed into the next available backup buffer (BB 123 or BB 124). The plurality of available backup buffers reduces the chance that the system will be required to delay data transfer from LD 101 to a backup buffer.

Figure 4:
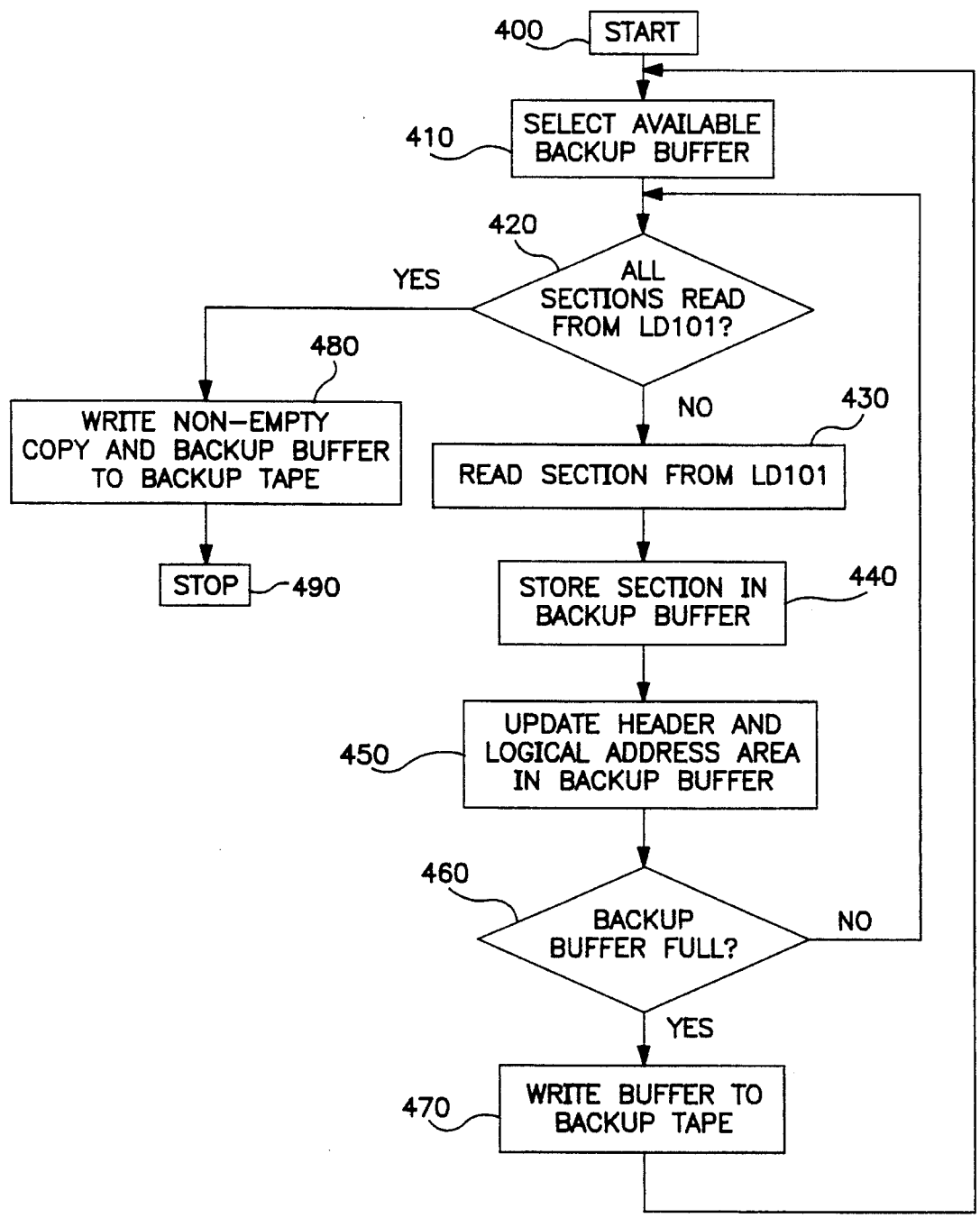
FIG. 4 is a flow diagram of the backup process.
Figure 5:
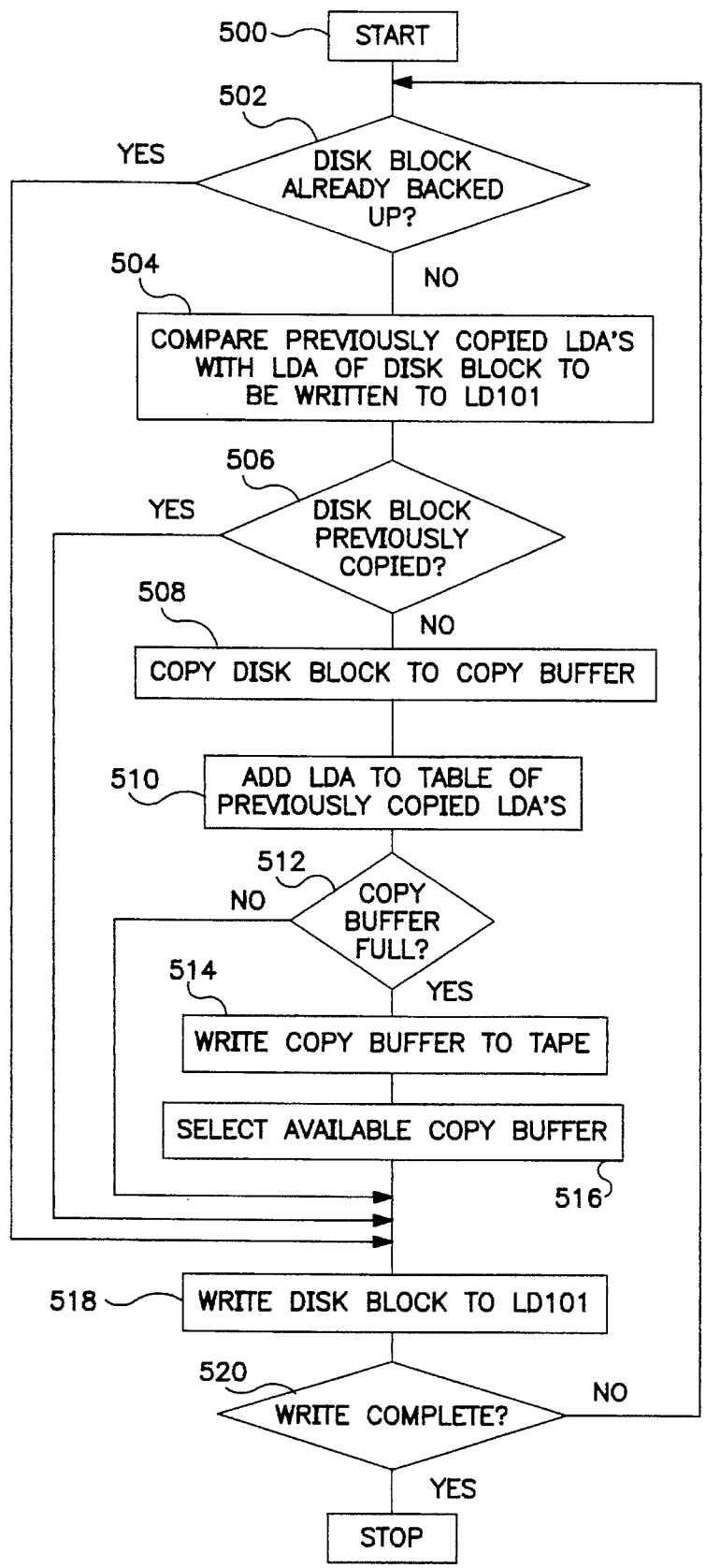
FIG. 5 is a flow diagram of the copy process.

The method of retrieving and saving backup data is shown in FIG. 4. After the backup is initiated, a backup buffer is selected. A 64K section is read from LD 101 and stored in a backup buffer. In connection with the storing in the backup buffer, the buffer header and LDAA information are updated. If the buffer is full, the contents are written to the backup tape. If the buffer is not full and unread sections remain on LD 101, another section is read and the process is repeated. When the final section of LD 101 is read, the backup buffer and the copy buffer may contain information, but be less than full. To ensure that this information is properly saved, after the last section is read from LD 101, the backup and copy buffers are checked and the non-empty buffers are written to tape BT 141. This completes the backup process.

As mentioned above, LD 101 is depicted in FIG. 2 as being read from left to right. Therefore, at the instant shown in FIG. 2, all data in LD 101 to the left of 201 has already been sent to BT 141 and data from 201 and 202 has been placed in BB122 in preparation for movement to BT 141. The information in section 203 and all other sections of LD 101 to the right of 203 has not yet been captured to BT 141 and, therefore, cannot be allowed to be modified by the users of HC 120 until the information at the locations where the write has been requested has been saved.

Since the system is available to users while the backup is underway, it is probable that at some point during the backup process users will want to modify some data in LD 101 that has not yet been backed up. The system handles this by making a copy of any original data not yet backed up before the data is allowed to be modified. Copy buffers CB 125–127 are used for this purpose.

For example, in FIG. 2, the portion of LD 101 identified as 205 represents data that a user has requested be modified while the backup is in progress. Since this portion of LD 101 has not yet been backed up to BT 141, the write request is temporarily stopped and a copy of the data currently in 205 is stored in section 226 of CB 125. In a preferred embodiment, the operating system does not need to dedicate a specific processing task to perform the copying to the copy buffers. The user task which is requesting the write to LD 101 is "borrowed" to perform the necessary copying to the copy buffer and is then returned to the user to perform the write to LD 101.

Once the data from 205 is copied, the write request to 205 is allowed to proceed. Data saved in this manner will be referred to herein as "copied" data to differentiate it from "backup" data, which refers to the data retrieved from LD 101 and placed in backup buffers BB 122–124 during the backup. Unlike backup data, which is retrieved from LD 101 in 64K sections, only the disk blocks actually to be modified are copied into CB 125–127. In the event that the data to be copied to the copy buffer is larger than the available space remaining in the buffer, whatever space is remaining in the buffer is filled with a portion of the data and the rest of the data is copied into another available copy buffer.

Since only the data at the time, the backup started is required to be preserved, a table of disk block logical data addresses which have already been copied to CB 125 during the backup is maintained in memory 121. When a write request to LD 101 is received, this table is checked to see of any part of the write request is to a logical disk address which has already been copied to a copy buffer. If so, that portion of the data is not copied again, thereby avoiding the possibility of repetitive copying of the same areas of the disk memory.

Data is copied from LD 101 to CB 125 in the order in which the write request was received. Therefore, as can be seen from the order of data in 226, the write request to area 205 occured first, followed by a request to area 206 and finally a request to area 207. As depicted in FIG. 2, each of these sections has been copied into CB 125 prior to allowing the write operation to LD 101 to proceed. Section 226 has remaining space available for future copied data. As mentioned above, if the next write request to LD 101 is of a size that exceeds the remaining space in 226, the remaining 226 space will be filled and whatever data to be copied is left over will be placed in another available copy buffer, e.g. CB 126. Similarly to the backup buffers, when CB 125 is filled, the contents of the buffer are moved to BT 141 as a logical tape record.

As mentioned above, attempts to write to the area of LD 101 that has not been backed up are stopped until the existing information in that area is saved to a copy buffer. Once the existing information is saved, the write operation proceeds. When the backup process reaches a section which has been previously written to during the backup, the entire section, including the part modified during the backup, is read into a backup buffer and moved to tape. For example, when area 203 is read to BB 122, it will contain the new information earlier written into section 206. As will be discussed below, during the restoration operation, the system will properly reconstruct the original data using the backup data records and copied data records from BT 141.

Attempts to write to LD 101 to the left of area 203 are allowed to proceed since the data in that area of LD 101 has already been saved. For example, area 208 represents a portion of 201 that was modified after the original data in 201 had been moved to BB 122. Since the original data in 201 had already been preserved, there was no need to make another copy of the data at the 208 location and the write was performed.

The data copying process discussed above is depicted in FIG. 5. Unlike the backup data process depicted in FIG. 4, which is running constantly during the backup, the data copying process is only activated when a user write command is received.

In FIG. 2, BT 141 is a magnetic tape moving from right to left such that the area on the tape designated as BT 142 will be written to before the area designated as BT 143. BT 142–144 are 224K spaces on BT 141 that will be occupied by tape records from the backup and copy buffers. BT 142 already contains a tape record, BT 143 is, therefore, the next available space. Whichever buffer fills first, BB 122 or CB 125, will have its contents moved to BT 143. The contents of the subsequent buffer to become filled will go to the tape at BT 144 and so forth. Therefore, if there was user write activity to unbacked up areas of LD 101 during the backup process, at the conclusion of the backup, BT 141 will contain tape records from CB 125–127 interspersed among the backup data tape records from BB 122–124. Since BT 141 will include the original LD 101 data plus headers and address tables as well as all modifications to LD 101 made during the backup process, the total amount of information stored on BT141 will exceed the size of the original data on the logical disk.

Full Restore

If a failure or error of some type occurs, it will be necessary to restore the file system using the backup tape or tapes. The restore operation may be one of two types: a full logical disk restore or a partial restore of selected files. The normal preparatory steps, such as mounting the correct tape and identifying the correct disk unit to which the data will be restored, are well understood and not discussed here.

Figure 3:
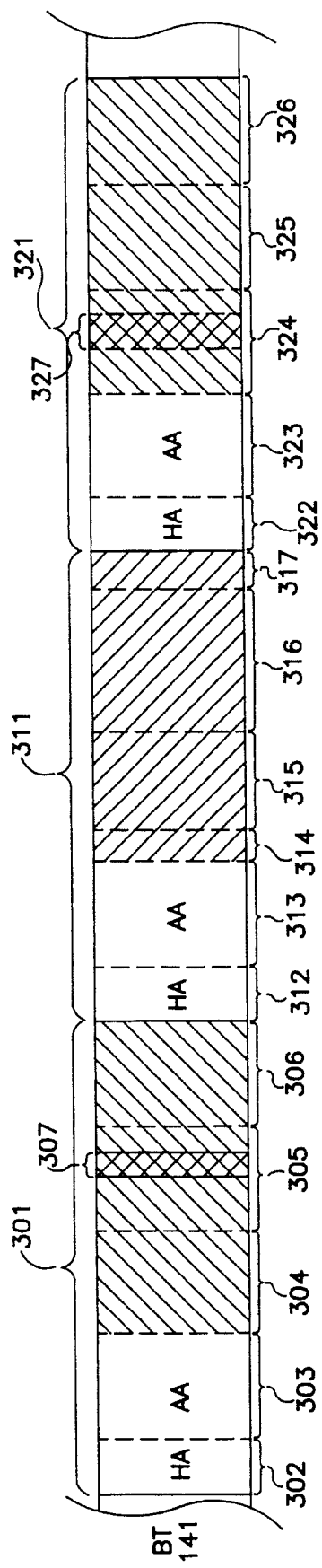
FIG. 3 depicts the logical organization of the data on Backup Tape (BT) 141.

To illustrate the restore operation, FIG. 3 shows a portion of BT 141 holding tape records BT 301, 311 and 321. As discussed above, each tape record contains a header area, a table of disk block logical addresses and a data area. Looking at FIG. 3, BT 301 contains backup data in section 304–306. Block BT 311 contains copied data in sections 314–317. BT 321 contains backup data in sections 324–326. Data area 307 is a portion of backup data section 305 that was modified after the backup operation was underway. As discussed above, before new information is allowed to be written to an area of LD 101 not already backed up, a copy of the data at that location is placed in a copy buffer. Data sections 314–317 contain four blocks of copied data. Each disk block in each of these sections will, therefore, have the same logical disk address as a backup data disk block contained in a backup tape file elsewhere on BT 141. The relevant backup tape files may be either ahead or behind of tape record 311 on BT 141 and need not be in a tape record that is contiguous to the copied tape record.

By way of example, in FIG. 3, areas 314 and 317 of copied tape record BT 311 are copies,of the information originally at areas 307 and 327, respectively, in LD 101 at the time the backup started. The data on BT 141 at areas 307 and 327 is data written to LD 101 While the backup operation was underway.

Figure 6:
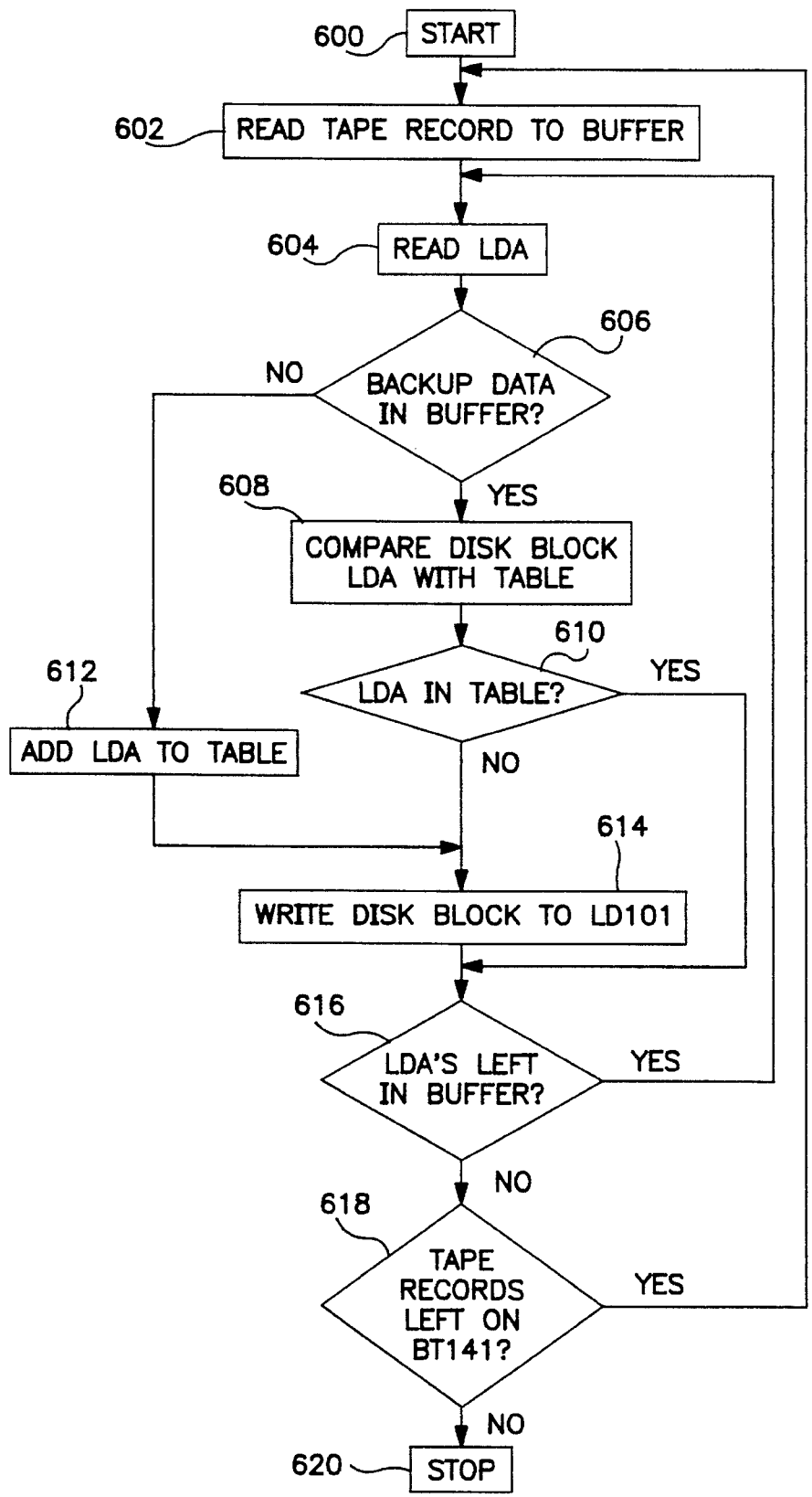
FIG. 6 is a flow diagram of the full restore process.

A discussion of FIGS. 3 and 6 will illustrate the handling of data during a full restore. In the restore operation, as in the backup operation described above, it will be clear to one in the art that multiple processing tasks assigned to performing these operations could be efficiently employed to perform the restore operation. BT141 is moving from right to left, i.e., being read from left to right as the tape moves past the read electronics. Each tape block is read sequentially from BT 141 and placed in a buffer. Unlike the backup operation described above, there is no need for separate backup and copy buffers during the restore operation. The same set of buffers are used for all tape records, whether they contain backup data or copied data. Typically, fewer buffers will be required during the restore process than were used during the backup process. In a preferred embodiment, ten buffers for receiving tape records from BT 141 are employed in a full restore and two buffers are employed in an individual file restore operation, discussed below.

The header area of the tape record will indicate whether the record contains backup data or copied data. To ensure that the data is properly restored, the system maintains a Disk Block Address Table containing the logical address of each disk block of copied data retrieved from BT 141 during the restoration process. Each data disk block address in the LDA table of each tape record of backup data is compared with the Disk Block Address Table to determine if any disk blocks in that record have appeared in an earlier tape record of copied data.

In the portion of BT 141 shown in FIG., 3, record BT 301 is retrieved first and stored in a buffer. HA 302 is read to determine the data type. In this example, HA 302 indicates that the record contains backup data. Each entry in LDAA 303 is then individually compared to the contents of the Disk Block Address Table and appropriate action is taken.

If a disk block address from LDAA 303 is already in the Disk Block Address Table, it means that that disk block must have appeared as copied data in an earlier tape record and has already been restored to LD 101. Since copied data always supercedes data from a backup tape record and since the copied block has already been restored, a disk block from BT 301 having an address already in the Disk Block Address Table is not written to LD 101. If, however, the disk block address does not appear in the Disk Block Address Table, the disk block is restored to LD 101.

Tape record BT 311 is now retrieved. HA 312 indicates that BT 311 contains copied data. As mentioned above, during the backup process no disk block is copied to a copy buffer more than once. While the same logical disk address may appear in a tape record of copied data and a tape record of backup data, the same logical disk address will not appear in more than one tape record of copied data. Therefore, if the tape record contains copied data, there is no need to check the Disk Block Address Table for a match. The disk block addresses are added to the table and the disk blocks are restored to LD 101.

Therefore, when the addresses in LDAA 303 are compared to the Disk Block Address Table, none of the disk block addresses appears and all data from sections 304–306 is stored on LD 101. When the copied data in tape record 311 is retrieved, all data in sections 314–317 is stored in LD 101.

The copied data from section 314 will replace the data from section 307 earlier stored in LD 101 at the same logical disk addresses. When the addresses in LDAA 323 are subsequently compared to the Disk Block Address Table, a match occurs for the data at location 327, which will have the same logical disk addresses as the copied data at 317. In this case, since copied data from 317 has already been restored to LD 101 and copied data takes precedence, the data from 327 is not stored in LD 101. All other data from sections 324–326 where a logical disk address match did not occur is stored in LD 101.

The restoration will continue in this manner until LD 101 has been completely restored to its condition at the time the backup was started.

Individual File Restore

Occasionally it may be desirable to restore only a few selected files. Since less than the entire file system is being restored, a different procedure is followed. As discussed in more detail below, the system must (a) resolve the list of files to be restored into the disk block addresses containing those files, (b) review BT 141 to determine which tape records contain one or more of those disk block addresses, (c) organize the list of tape records from the previous step into the proper sequence reflecting the order of records on BT 141, (d) retrieve those tape records from BT 141 and (e) restore the appropriate disk files. This will require that BT 141 be read twice. The first pass of BT 141 is used to establish the structure of the file system. The second pass is used to retrieve the tape records containing the identified disk blocks.

Data will typically constitute the bulk of disk blocks on LD 101, however, along with disk blocks containing data, LD 101 will also include a number of disk blocks which contain the various necessary information about the structure of the file system. Typically, as is well understood, there are several different types of these "file structure" blocks, such as name blocks, index blocks and control blocks.

During the first pass, each tape block of tape BT 141 is sequentially read into a buffer in memory 121. Each disk block in the tape block is identified as either a data block or a file structure block. Different techniques may be used by different operating systems to differentiate between data blocks and structure blocks. For example, the AOS/VS II operating system uses a block ID in the file header area of each disk block. As another example, the UNIX operating system reserves a portion of the logical disk address space for storing file structure blocks, therefore file structure blocks can be identified by checking their LDA.

As file structure blocks are identified, three tasks are performed concurrently: (1) the file structure blocks are collected into a File Structure File and each file structure block is assigned a unique block number, (2) an LDA/FS table is created in memory mapping the logical disk address of each file structure block to the file structure block number for that block in the File Structure Block File and (3) an LDA/TR table is created in memory mapping the logical disk address of each data block to the tape record number at which that data block resides and, if more than one tape is required for a backup, the tape volume number where the file structure block is located.

As discussed above, the same disk block logical disk address may appear on BT 141 once in a backup tape record and again in a copied tape record. Since the copied block is always the preferred information, during the construction of the tables the tape records of disk blocks of copied data are given precedence over and supersede the tape records of disk blocks of backup data having the same logical disk addresses. Therefore, no logical disk address will appear more than once in any table.

At the completion of the first pass, therefore, all file structure blocks are in the File Structure Block File and all logical disk block addresses will appear in one or the other of these two tables, sorted by logical disk address. Table 1 is an example of an LDA/FS table.

TABLE 1

| Logical Disk Address of File Structure Blocks | File Structure Block Number |
|---|---|
| 0 | 0 |
| 1 | 1 |
| . | . |
| . | . |
| 14576 | 54 |
| 14577 | 55 |
| 37412 | 142 |
| 37413 | 143 |
| . | . |
| . | . |

Table 2 is an example of an LDA/TR table.

TABLE 2

| Logical Disk Address of Data Blocks | Tape Record |
|---|---|
| . | . |
| . | . |
| 32526 | 88 |
| 32527 | 88 |
| 43521 | 45 |
| 57412 | 56 |
| 58392 | 57 |
| 59561 | 57 |
| . | . |
| . | . |

The next step is to use the File Structure Block File and the LDA/FS and LDA/TR tables to Generate a list of all pathnames on BT 141. This procedure is well understood and is a common feature of modern operating systems. Since this is a partial restoration, the system user will specify the particular files to be restored. This could be done, for example, by using a text editor to edit the list of all pathnames to create a new file containing the pathnames of the set of files to be restored. The pathnames in the new file are then resolved in the usual fashion to derive the logical disk address of the disk blocks associated with each of the pathnames to be restored.

During the resolution process of these pathnames, (1) the directory hierarchy for the pathnames is stored on the logical disk and (2) a File Restore Table is created to track all data blocks that must be restored. In a preferred embodiment, the File Restore Table is constructed as a binary tree structure sorted by BT 141 tape record. As each data block to be restored is identified, it is added as an entry to the table. An illustration of a File Restore Table is shown in Table 3.

TABLE 3

| Tape Record | Logical Disk Address | Restore Block Number |
|---|---|---|
| . | . | . |
| . | . | . |
| 45 | 43521 | 0 |
| 56 | 57412 | 1 |
| 57 | 58392 | 0 |
| 57 | 58392 | 1 |
| 88 | 32526 | 0 |
| 88 | 32527 | 2 |
| . | . | . |
| . | . | . |

The File Restore Table includes the logical disk address of each disk block to be restored and the restore file block number. The restore file block number specifies the particular file block within the restored file where the data is to be written.

Figure 7:
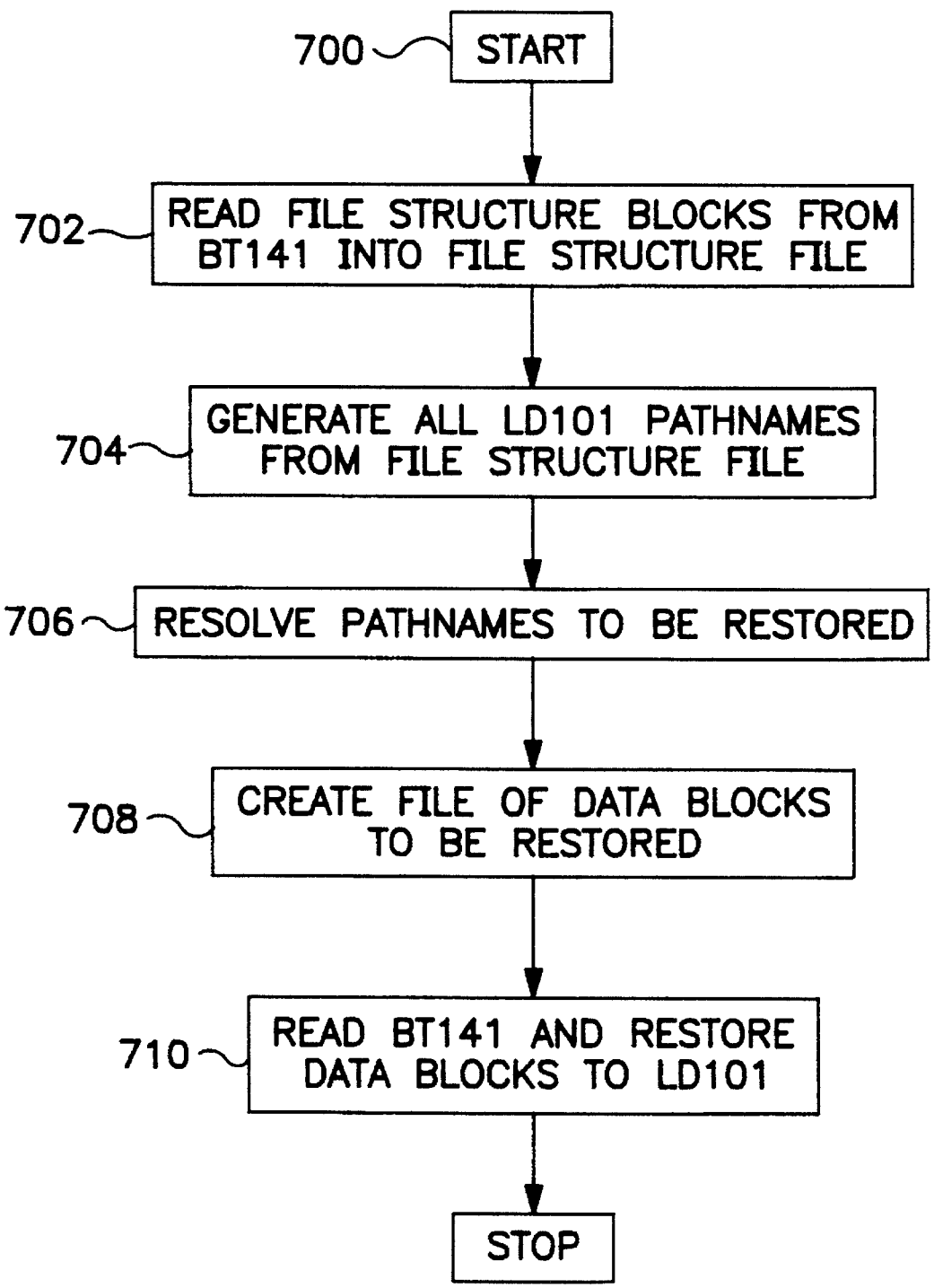
FIG. 7 is a flow diagram of the individual file restore process.

Once all pathnames have been resolved, the File Restore Table is complete. Having the table sorted by tape record number allows all files to be restored in one pass of BT 141. The second pass of BT 141 is now performed to complete the restoration of the individual files. The tape is scanned until the first tape record number from File Restore Table is found. The tape record is read and the disk blocks specified in the File Restore Table are placed in buffers. The buffers are then stored on logical disk 101 at the location specified by the disk block logical disk address. FIG. 7 summarizes the individual file restore procedure.

The particular embodiment above is to be considered in all respects as illustrative and not restrictive. The scope of the invention is indicated by the appended claims rather than by the foregoing description.

I claim:
1. In a data processing system having a disk peripheral for storing information, a tape peripheral, a central processing unit and a memory having at least one backup buffer and at least one copy buffer, the method of backing up the information from the disk peripheral to the tape peripheral comprising the steps of:
   (a) reading a section of disk blocks from the disk peripheral;
   (b) storing the section in a backup buffer;
   (c) when the backup buffer is full, storing the disk blocks stored in the backup buffer in step b on the tape peripheral;
   (d) repeating steps a–c until all disk blocks on the disk peripheral have been stored on the tape peripheral; and
   (e) if a request is made to write to one or more disk blocks in the disk peripheral while steps a–d are being performed, performing the following steps for each disk block to which the write request was made:
      (i) suspending the write request
      (ii) determining if the disk block has already been written to a backup buffer during the backup operation;
      (iii) if already written to a backup buffer, allowing the write request to that disk block to proceed;
      (iv) if not already written to a backup buffer, determining if the disk block has already been written to a copy buffer,
      (v) if already written to a copy buffer, performing the write request;
      (vi) if not already written to a copy buffer, storing the disk block in a copy buffer and performing the write request;

(vii) when the copy buffer is full, storing the disk blocks stored in the copy buffer in step (vi) on the tape peripheral.

2. The method of claim 1 wherein each disk block has an associated logical disk address and wherein step (e)(vi) includes the substep of adding the logical disk address of the disk block to a table of logical disk addresses of disk blocks which have been stored in a copy buffer during the backup operation.

3. The method of claim 2 wherein step (e)(iv) includes the substep of comparing the logical disk address of the disk block to said table of logical disk addresses.

4. The method of claim 1 wherein each disk block has an associated logical disk address and wherein in step (a) the disk blocks are read sequentially from the lowest logical disk address used by the disk peripheral to the highest logical disk address used by the disk peripheral and wherein step (e)(ii) includes the substep of comparing the logical disk address of the disk block to which the write request was made with the logical disk address of the disk block most recently read in step (a).

5. In a data processing system having a CPU, a memory, a disk peripheral and a tape peripheral, and wherein information from the disk peripheral has been stored on the tape peripheral in logical tape records, each said logical tape record containing (i) a plurality of disk blocks of information, (ii) a like plurality of logical disk addresses, each logical disk address being associated with one of said plurality of disk blocks of information and (iii) means for indicating if the information in said tape record is of a first type, a method of restoring the information from the tape peripheral to the disk peripheral comprising the steps of:

(a) reading a logical tape record from the tape peripheral into the memory and determining if the information contained in the tape record is of said first type;

(b) if so, writing the disk blocks from said tape record to the logical disk;

(c) if not, for each disk block in said tape record, determining if another disk block has been restored to the disk peripheral at the same logical disk address, and, if not, writing the disk block to the disk peripheral.

6. The method as recited in claim 5, wherein step (b) includes the additional step of adding the logical disk addresses associated with said disk blocks to a table of logical disk addresses of disk blocks already restored to the disk peripheral.

7. The method as recited in claim 5, wherein step (c) includes the additional step of adding the logical disk address associated with each said disk block written to the logical disk to a table of logical disk addresses of disk blocks already restored to the disk peripheral.

8. In a data processing system having a CPU, a memory, a disk peripheral and a tape peripheral, and wherein information from the disk peripheral has been stored on the tape peripheral in logical tape records, each said logical tape record having an identifier and containing (i) a plurality of disk blocks of information, (ii) a like plurality of logical disk addresses for said disk blocks, each said logical disk address being associated with one of said plurality of disk blocks of information and (iii) means for indicating if the tape record contains file structure information, a method of restoring a selected portion of the information from the tape peripheral to the disk peripheral comprising the steps of:

(a) reading a tape record from the tape peripheral into the memory and examining each disk block in the tape record;

(b) if a disk block contains file structure information, placing the disk block into a file structure file in memory;

(c) if a disk block contains other than file structure information, entering the identifier of the tape record and the logical disk address of the disk block into a table in memory;

(d) repeating steps a–c for each tape record;

(e) identifying the logical disk addresses of the disk blocks making up the selected portion of the information to be restored;

(f) identifying the tape records which contain one or more of the disk blocks identified in step (e) and creating a sequential list in memory of the identified tape records;

(g) reading a tape record identified in step (f) and writing to the disk peripheral all disk blocks identified in step (e) for the tape record;

(h) repeating step (g) until all tape records identified in step (e) have been processed.

9. The method of claim 8 wherein step (e) includes the substeps of generating all pathnames contained in the tape peripheral and resolving the pathnames for the information to be restored into the specific disk blocks to be restored.

* * * * *